No. 760,654. PATENTED MAY 24, 1904.
J. F. SMITH.
CORN HARVESTER.
APPLICATION FILED FEB. 17, 1903.
NO MODEL. 3 SHEETS—SHEET 1.
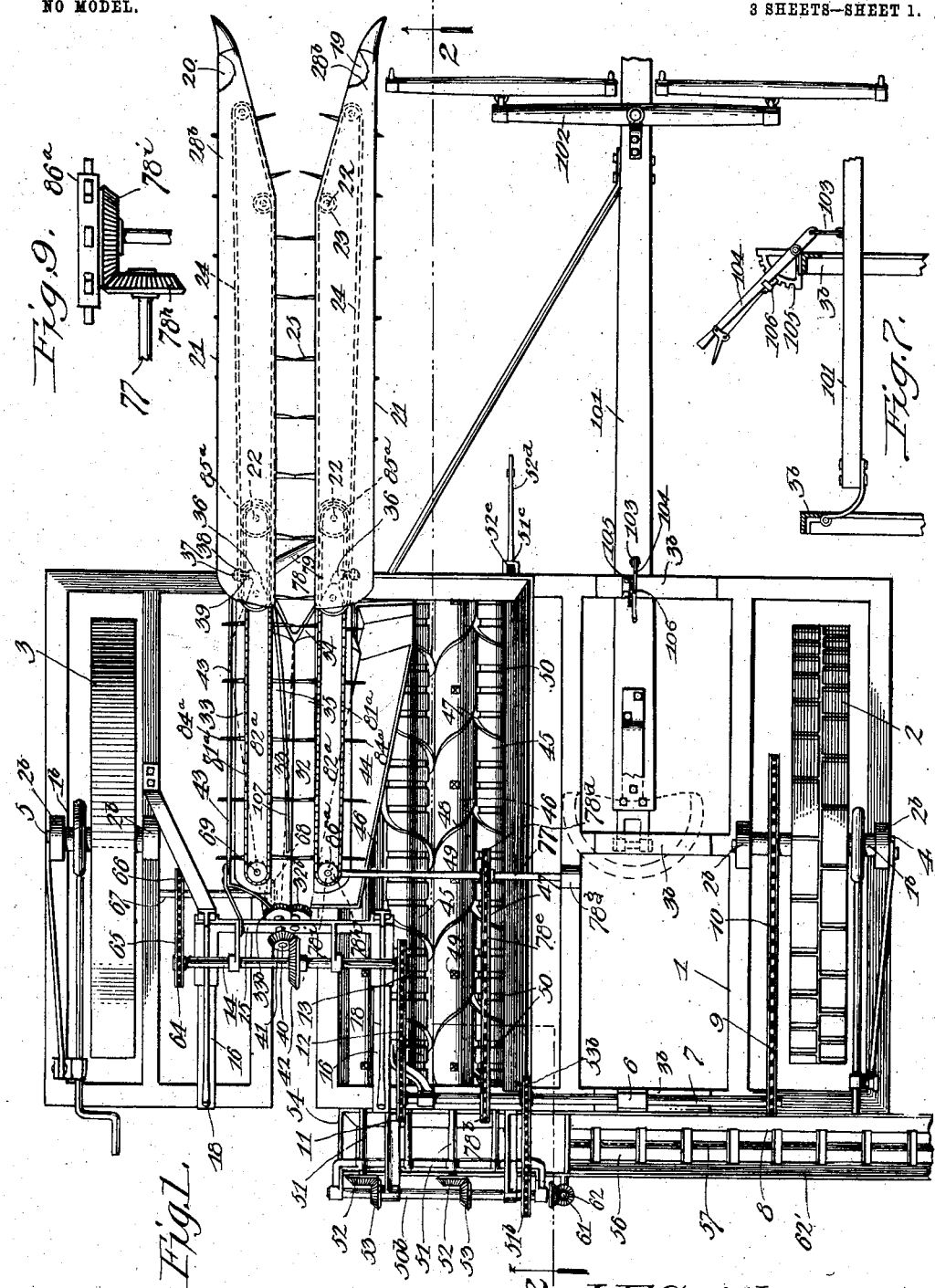
Witnesses
J. F. Smith, Inventor.
by C. A. Snow & Co.
Attorneys No. 760,654. PATENTED MAY 24, 1904.
J. F. SMITH.
CORN HARVESTER.
APPLICATION FILED FEB. 17, 1903.
NO MODEL. 3 SHEETS—SHEET 2.
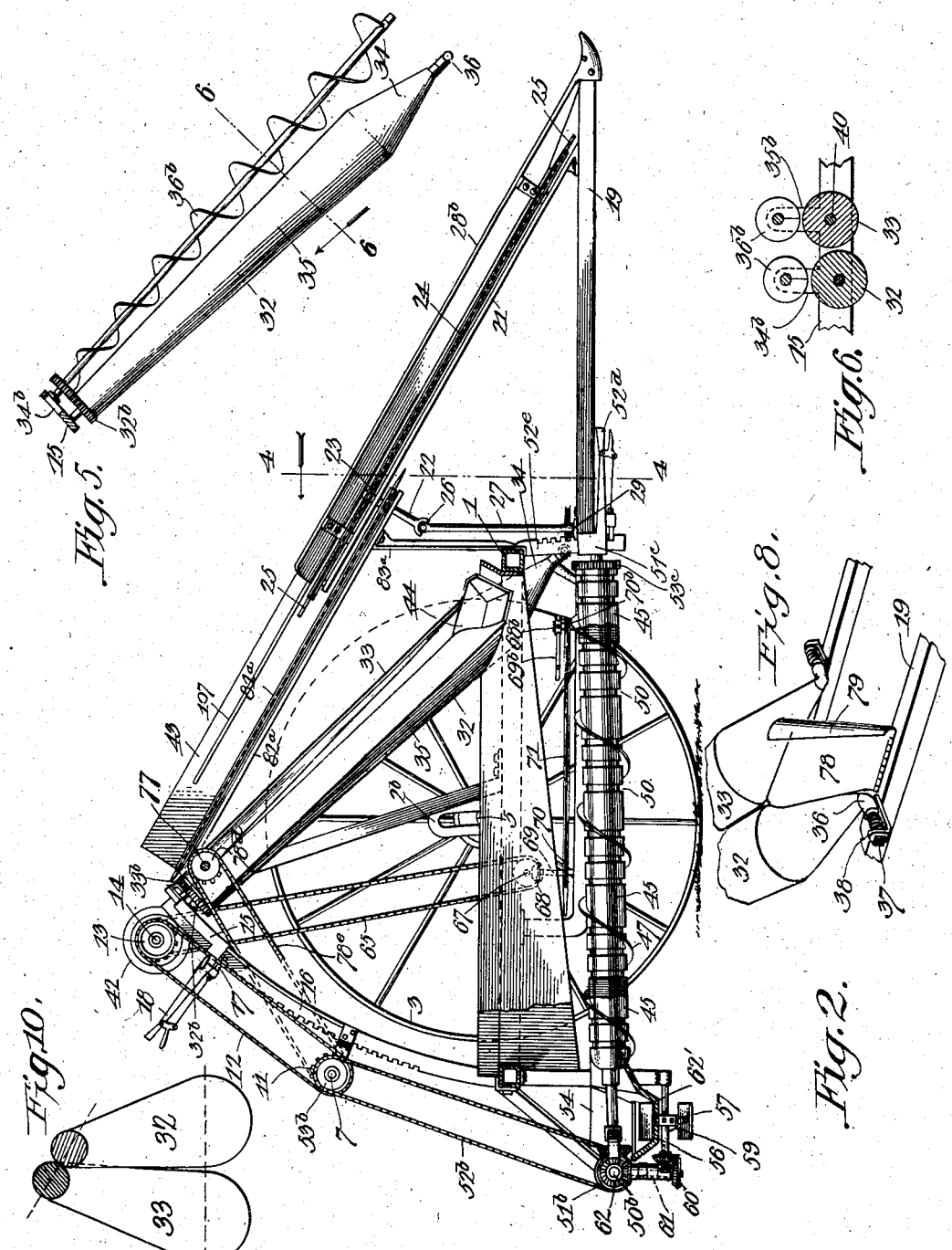
Witnesses
J. F. Smith, Inventor.
by C. A. Snow & Co.
Attorneys

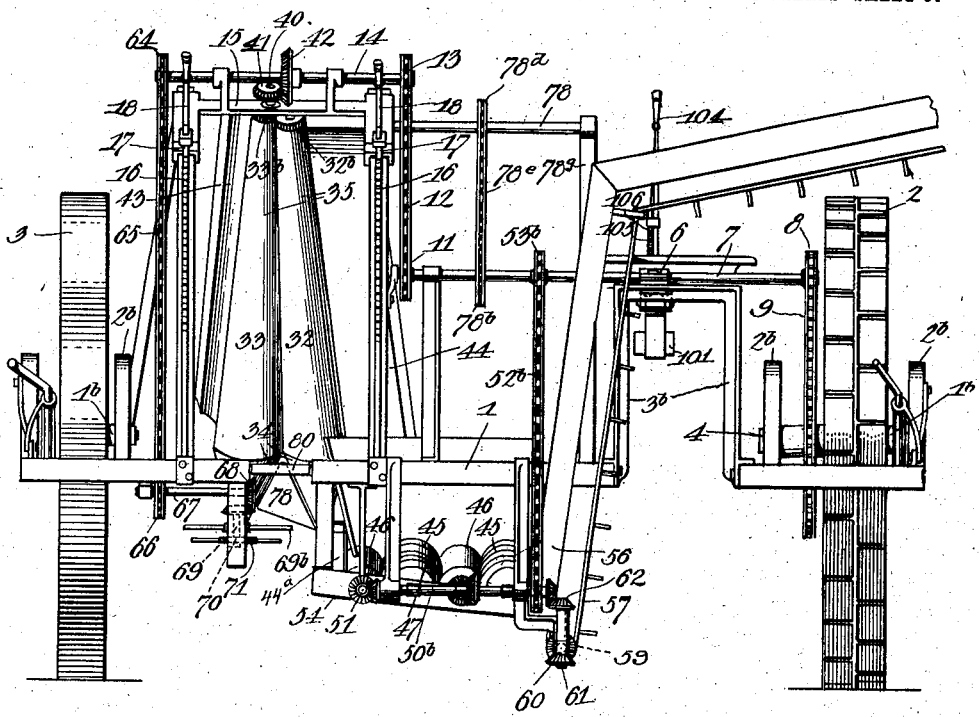

No. 760,654. Patented May 24, 1904.

UNITED STATES PATENT OFFICE.

JOHN FRANKLIN SMITH, OF BALDWIN, KANSAS.

CORN-HARVESTER.

SPECIFICATION forming part of Letters Patent No. 760,654, dated May 24, 1904.

Application filed February 17, 1903. Serial No. 143,865. (No model.)

*To all whom it may concern:*

Be it known that I, JOHN FRANKLIN SMITH, a citizen of the United States, residing at Baldwin, in the county of Douglas and State of Kansas, have invented a new and useful Corn-Harvester, of which the following is a specification.

This invention relates to that class of machines which are broadly known as "corn-harvesters," and my present invention relates more particularly to that class of corn-harvesters comprising an organized machine whereby the ears of corn are stripped or gathered from the stalks and husked, the husked ears being delivered into a suitable receptacle, which may be a wagon driven alongside the harvesting-machine.

My invention has for its object to provide a machine of this class which shall possess superior advantages in point of simplicity, durability, and general efficiency.

A further object of my invention is to strip the ears unfailingly from the stalks without loss.

A further object of the invention is to provide husking means whereby the husks shall be stripped and separated from the ears and the latter be delivered to a carrier, and, further, to provide means whereby shelled corn shall be saved.

With these and other objects in view my invention consists in the improved construction, arrangement, and combination of parts which will be hereinafter fully described, and particularly pointed out in the claims.

In the accompanying drawings, Figure 1 is a top plan view of a corn-harvesting machine constructed in accordance with the principles of my invention. Fig. 2 is a sectional elevation of the same, taken on the line 2 2 in Fig. 1. Fig. 3 is a rear elevation. Fig. 4 is a sectional detail view taken on the line 4 4 in Fig. 2. Fig. 5 is a detail view showing a modification whereby the snapping-rolls are combined with spiral screws for assisting in feeding the stalks to said snapping-rolls. Fig. 6 is a sectional detail taken on the line 6 6 in Fig. 5. Fig. 7 is a detail view illustrating the method of connecting the tongue with the frame of the machine. Fig. 8 is a detail view illustrating the hinged tray 78 and related parts. Fig. 9 is a detail view showing one end of the shaft 77 and intermediate means for driving the adjacent carrier-chain. Fig. 10 is a perspective detail view taken from the rear and showing all excepting the upper ends of the snapping-rollers and illustrating the relative positions of said snapping-rollers.

Corresponding parts in the several views are indicated by similar numerals of reference.

The frame of my improved machine, which is generally designated 1, has been shown as mainly rectangular in shape, it being understood, however, that as regards the frame structure departures may be made from the exact form herein shown whenever it shall be found necessary in order to adapt the said frame more efficiently to the purpose of my invention. The said frame is supported upon wheels 2 and 3, mounted upon independent axles 4 and 5, the bearings or boxes of which, $1^b$, are independently adjustable in yokes $2^b$ carried by the frame, thus permitting the latter to be raised or lowered, as may be desired, the exact adjusting means being no part of my invention. The wheel 2 is securely mounted upon a sleeve which is revoluble upon the axle. Said wheel 2 constitutes what is known as a "driving-wheel," by means of which motion is supplied to the operative parts of the device.

The frame 1 is provided with arches $3^b$, through which the row of stalks from which the corn is husked passes, and the rear arch $3^b$ is provided with suitably-extending brackets 6, forming bearings for a transverse shaft 7, one end of which carries a sprocket-wheel 8, connected by a chain 9 with a sprocket-wheel 10 upon the axle 4. The shaft 7 also carries a sprocket-wheel 11, which is connected, by means of a chain 12, with a sprocket-wheel 13 upon a counter-shaft 14, which is journaled in suitable bearings in a frame 15, which is supported upon a pair of segment-racks 16 and held at any desired adjustment thereon by means of dogs or pawls 17, operated by hand-levers 18. The teeth of the rack-bars 16 are spaced apart a distance equal to the length of the links in the chain 12. Thus when adjustment of the frame 15 upon the supporting rack-bars is made the chain 12 is to be lengthened or shortened by removing or adding links, one link being removed or added for each notch that the frame is lowered or raised. It will thus be seen that the said chain will always properly connect the sprockets 11 and 13 and cause motion to be transmitted from the shaft 7 to the shaft 14.

The frame 1 supports a pair of forwardly-extending gathering-arms 19 and 20, which diverge in the usual manner at their front ends and which support the inclined shelves 21, in which bearings are provided for the shafts 22, carrying sprocket-wheels 23 for the endless chains 24, which are equipped in the usual manner with fingers 25, that extend laterally to engage the cornstalks and guide them rearwardly between the gathering devices as the machine progresses over the field. The rear shafts 22 of these gathering devices are connected at their lower ends, by means of knuckle-joints 26, with vertical shafts, (designated, respectively, 27 and 28,) the lower ends of said shafts being provided with steps or bearings 29 and 30, disposed, respectively, upon the arms 19 and 20. Motion is transmitted to these shafts and from the latter to the endless chains 24 by means which will be more fully hereinafter described.

Brackets forming additional bearings for the shafts 27 and 28 may be provided, if deemed necessary for the purpose of insuring the necessary stability and steadiness of movement, such brackets being mounted or formed upon any convenient part of the frame of the machine.

I prefer to cover or inclose the gathering-arms with hoods or covers, as 28$^b$, of sheet metal or other suitable material, in order to protect the parts and to prevent entanglement. These hoods may be of any suitable construction, and they may be secured in position, preferably detachably, in any convenient manner.

The means for stripping the ears from the stalks are located in rear of the gathering devices which have just been described, and said stripping means include a pair of rollers 32 and 33, each of which comprises a lower conical portion 34 and an upper tapering portion 35, which joins the base of the cone 34 and tapers gradually in an upward direction. The lower ends or points of the cones 34 are journaled in bearings, here shown as consisting of elbows 36, one of which, that of the outer roller 33, is provided with a laterally-extending arm 37, extending through a lug 38, which is supported upon the frame of the machine. A spring 39, which is coiled upon the arm 37 between the lug 38 and the elbow 36, serves to press the lower end of the roller 33 in an inward direction or in the direction of the roller 32, as will be readily understood.

In this manner provision is made for the separation of the lower ends or points of the rollers, which are thus permitted to adjust themselves to various thicknesses of stalks. The lower end of the roller 32 may be similarly mounted; but this is not considered necessary, inasmuch as the single spring will provide a sufficient degree of flexibility.

While I have referred to the conical points 32 and 33 as the "lower" ends of the rollers, it is not thereby to be understood that the latter are disposed vertically with relation to the frame of the machine, the said rollers being simply inclined in an upward and rearward direction, their upper ends being journaled in the adjustable frame 15, which has already been described, and provided with spur-gears 32$^b$ 33$^b$, meshing with each other, as shown.

The bearings of the snapping-rollers are extended, as shown at 34$^b$ 35$^b$, to form auxiliary bearings, in which spirally-ribbed rollers or screws, as 36$^b$, may be mounted, this being the modified form illustrated in Figs. 5 and 6, said screws being geared to and driven by the snapping-rollers for the purpose of directing the stalks of corn toward the said snapping-rollers, and thereby increasing the efficiency of the operation of the machine. These screws or spirally-ribbed rollers may, however, be dispensed with when desired. An important feature of the disposition of the snapping-rollers is that the upper end of the shaft of the outer roller is journaled in a plane above that of the inner roller, as will be clearly seen in Fig. 2 of the drawings as well as in the detail view Fig. 10, so that said rollers, which are slightly spaced apart at their lower ends, shall overlap at their upper ends, the outer roller 33 extending spirally across the inner roller 32. It will also be seen that while at their lower ends the rollers are spaced apart at their upper ends they are practically in contact with each other. The shaft 40 of the outer roller carries a pinion 41, which meshes with a bevel-gear 42 upon the shaft 14, whereby a rotary movement is transmitted to said roller. It will be readily understood that when stalks of corn enter between the conical-pointed lower ends of the rollers they will by the peculiar relative disposition of said rollers be bent in an inward direction toward the center of the frame of the machine and that as the machine progresses the rollers will gradually close in upon the stalks, and thus when the ears are reached they will be snapped off and be guided and caused to drop over the inner rollers and in an inward direction, the elevated position of the rear end of the outer roller normally preventing the ears from dropping in an outward direction. To assist in the certain attainment of this result, a shield 43 is provided, said shield being mainly supported by the frame 15 and adjustable therewith.

Adjacent to the inner stripping-roller 32 is supported an inclined trough or chute 44, which receives the ears stripped from the stalks by the said rollers and conveys the same in a downward and forward direction toward the front end of the frame of the machine, where the ears discharged from the said chute are deposited upon the husking-rollers. In the drawings hereto annexed I have shown two pairs of husking-rollers; but I desire it to be understood that I do not limit myself to the use of two pairs, while, on the other hand, at times only a single pair may be required or found necessary. The said husking-rollers, however, are invariably used in pairs, the rollers of each pair being designated, respectively, 45 and 46. The rollers 45 are provided with ribs 47, formed spirally thereon and engaging grooves 48, which are formed spirally in the rollers 46. The latter are also provided with suitably-disposed points or projections 49, forming husking-pegs, which are diposed in alinement with annular grooves 50 in the roller 45. The shafts of the several husking-rollers are provided with suitable bearings in the frame 51°, the shafts 51 of the rollers 46 being extended rearwardly and provided with bevel-pinions 52, meshing with bevel-gears 53 upon a shaft 50$^b$, from which motion is transmitted to said rollers and which also serves as a support for the frame 51°, which is pivotally mounted upon said shaft. Motion is transmitted to the husking-rollers from the shaft 50$^b$, which is provided with a sprocket-wheel 51$^b$, connected by a chain 52$^b$ with a sprocket-wheel 53$^b$ upon the shaft 7, from which it derives motion. Said rollers are also connected in pairs by means of spur-gears 53° at their front ends, whereby the rollers of each pair are caused to rotate in opposite directions. The front end of the pivoted frame supporting the husking-rollers is vertically adjustable by means of a catch-lever 52$^d$, connected with said frame and engaging a rack 52°, whereby it may be supported at any desired elevation within the limits of the segment-rack. The rollers may thus be tilted in a downward and rearward direction at any desired degree of inclination which will facilitate operation.
It will be observed that when, as in the present instance, two pairs of rollers are used the chute 44 will be arranged so as to discharge into the space between the forward ends of the two pairs of rollers or, in other words, upon the front ends of the roller 46 of the one pair and the roller 45 of the other pair, said rollers revolving upwardly and outwardly from each other, so that the ears will be naturally carried over the said rollers 46 and 45 and into contact with the adjacent rollers 45 and 46, whereby they are to be stripped of their husks. This stripping operation is performed by the joint action of the pegs 49, which loosen and engage the husks, the ribs 47, engaging the grooves 48, whereby the ears are carried in a rearward direction upon the rollers, and by the contacting portions of the rollers themselves, which engage the husks and tear or strip them from the ears, the latter passing rearwardly, as stated, while the husks are discharged downwardly between the rollers. In this manner the ears will be quickly and effectually deprived of the husks, the latter being discharged upon the ground, while the ears are carried rearwardly and discharged over the rear ends of the rollers into a trough or receptacle 54, which is supported upon the rear part of the frame of the machine. The trough 54 is gently inclined, so that the husked ears deposited therein shall be discharged by gravity onto an endless carrier 56, disposed transversely at the rear part of the frame, said endless carrier being composed ordinarily of a chain 57, mounted upon sprocket-wheels
85 upon suitably-disposed shafts, one of which, 59, is connected by miter-gearing 60 with a short vertical shaft 61, which is connected by miter-gearing 62 with the shaft 50$^b$, from which motion is thus transmitted to the endless carrier 56. The latter works in a casing 62' in the manner of an ordinary elevator or carrier, said casing being bent, as shown, so as to clear the arches 3$^b$, and thereby avoid its being subjected to contact with stalks passing under the arches.
The shaft 14 is provided with a sprocket-wheel 64, connected by a chain 65 with a sprocket-wheel 66 upon a shaft 67, which is suitably mounted in the frame of the machine and which transmits motion through miter-gearing 68 to a short vertical shaft 69, the lower end of which carries a sprocket-wheel 70, connected by a chain 71 with a sprocket-wheel 72 upon the vertical shaft 28, whereby the gathering mechanism, supported upon the arm 20, is driven. A suitably-disposed short shaft 68$^b$ carries a small stiff reel 69$^b$ and a wheel 70$^b$, engaging the chain 71, whereby it is driven, said reel thus serving to assist in forcing refractory stalks between the snapping-rolls.
One of the frame-bars which support the lower ends of the snapping-rollers is provided with a hinged tray 78, which has a triangular portion that extends rearwardly between the conical front ends of the stripping-rollers, while the front edge of the said tray has a curve or roll 79 slanting in an upward and rearward direction, as will be seen most clearly by reference to Fig. 1 of the drawings. It will be seen that this tray is disposed between the gathering devices and the snapping-rollers, so that when the cornstalks approach the latter they will engage the slantingly-curved front edge of the said tray, tilting the latter upon its hinge sufficiently to permit the stalks to enter between the snapping-rollers. Immediately upon the passage of the stalks composing one stand of corn the tray 78 will gravitate to its normal position, which it occupies until engaged by the stalks composing the next stand. This pan or tray 78 serves as a receptacle for ears that are broken or such as become prematurely detached from the stalks, as well as for corn that becomes shelled or detached from the action of the snapping-rollers, the contents of the pan being intermittently discharged into a carrier-trough 44$^a$, which empties into the receptacle 54, hereinbefore referred to, whenever the said tray is tilted by the action of the corn. Auxiliary corn-saving trays of a similar construction may be hinged to the frame-bar underneath the snapping-rollers, one of said trays being indicated at 80 in Fig. 3.

The carrying mechanism, comprising the arms 19 20, with the shelves 21, shafts 22, sprocket-wheels 23, and chains 24, associated therewith, is supplemented by auxiliary endless carrying-chains 81$^a$, supported upon shelves 82$^a$, the lower ends of which are extended under the upper ends of the shelves 21 and are supported in part by means of suitably-disposed brackets 83$^a$. The chains 81$^a$, which are provided with fingers 84$^a$, are operated by means of sprocket-wheels 85$^a$ upon the shafts 22, the upper ends of said chains being mounted upon sprocket-wheels 86$^a$, suitably supported upon shafts at the upper ends of the shelves 81$^a$.

It will be understood that the disposition of the shelves 82$^a$, with the carrier-chains 81$^a$, with relation to the snapping-rollers may be changed within the scope of my invention, the object of said carrier-chains, which are provided with heavy stalk-engaging fingers, being to feed the stalks into contact with the snapping-rollers with certainty, as will be readily understood.

For the purpose of conveying motion to the endless-carrier mechanism supported by the arm 19 and its related parts I avail myself of a shaft 77, having a sprocket-wheel 78$^d$, connected by a chain 78$^e$ with a sprocket-wheel 78$^b$ upon the shaft 7, the shaft 77 being supported in suitable bearings, one of which may be formed in a bracket 78$^g$, rising from the frame of the machine. The shaft 77 carries at one end a bevel-gear 78$^h$, which may be made to mesh with a bevel-gear 78$^i$, mounted upon the shaft which supports the sprocket-wheel 86$^a$, thus transmitting motion to the parts referred to.

101 designates the tongue, which is provided with means for the attachment of the draft, here shown as an ordinary doubletree 102. The rear end of the tongue is pivotally connected with the arch 3$^b$ of the frame. At an intermediate point close to the front cross-bar of the frame of the machine the tongue is connected by a link 103 with a lever 104, fulcrumed to a segment-rack 105, which is supported upon the front arch 3$^b$ and which is provided with a suitably-operated dog or pawl 106, engaging the rack-segment for the purpose of maintaining the tongue in any position to which it may be adjusted with relation thereto. By this means the front end or nose of the machine may be raised or lowered, as will be readily understood.

The gathering mechanism supported upon the outer arm 20 is provided with rearwardly-extending elastic fingers 107, which are disposed adjacent to the inner side of the outer snapping-roller 33, so as to assist the latter in bending the stalks to a position at which the ears shall be surely and effectively engaged by the said snapping-rollers.

From the foregoing description, taken in connection with the drawings hereto annexed, the operation and advantages of my invention will be readily understood. When the machine travels over the field, the stands of corn will be engaged by the gathering devices, which latter also serve to pick up broken and down stalks, which are conveyed in a standing or upright position between the said gathering devices. The stalks of corn will engage the hinged tray 78, tilting the latter aside while the stalks pass into engagement with the snapping-rollers, the points of which, owing to their conical construction, are widely spaced apart. As the stalks enter the more contracted space or gap between the rollers the latter will serve to snap or remove the ears from the stalks, the ears being delivered onto the chute 44, while the tops of the stalks pass between the rollers and are left standing in the field. The ears are conveyed by the chute 44 to the husking-rollers, which strip and remove the husks therefrom, the ears being discharged into the trough 54, passing from thence to the endless carrier, whereby they are discharged.

It will be seen that my improved machine is especially constructed with a view to avoid unnecessary waste of corn, means being provided for the reception of loose and broken ears, as well as for the corn accidentally shelled or removed from the ears.

The general construction of the machine is simple and comparatively inexpensive, and in operation it will be found to be efficient for the purposes intended.

A special feature of my invention is the absence of all superfluous gearing, thereby causing lightness of draft.

It will be understood from the foregoing that when the machine progresses over the field the stalks which are deprived of their ears by the snapping-rollers are left standing in the field. On a subsequent round of the machine the stalks will not be entirely broken down, owing to the presence of the arches 3$^b$, which are so disposed that the draft-animals will walk on each side of the row. It is true that the stalks will be to some extent bent by this second passage of the machine, but not to such an extent as to be permanently injured or rendered worthless for fodder purposes. Thus the arches 3$^b$, while not of a height to admit of the passage of the stalks in a standing position and while not so positioned with relation to the draft as to absolutely avoid interference therewith, are disposed in such a manner that the desired result is attained with a sufficient degree of efficiency.

While I have in the foregoing described a preferred form of my invention, I would have it distinctly understood that I do not limit myself to the structural details herein set forth and described, such details being in many instances capable of change and modification without materially departing from the spirit or changing the scope of my invention. Thus, for example, means for transmitting motion other than chains and sprockets may be employed whenever desired, the relative proportions of the individual parts or members of the machine may be altered, and the frame structure may be changed when desired. Be it understood, therefore, that I reserve the right to any changes and modifications that may be resorted to without departing from the spirit and scope of my invention or sacrificing the utility of the same.

Having thus described my invention, I claim—

1. In a machine of the class described, a pair of snapping-rollers having conical points flexibly supported with relation to and in horizontal alinement with each other, and tapering bodies, and permanent supports for the upper ends of the tapering bodies of said rollers, the permanent support of one roller being disposed in a plane above that of the permanent support of the other roller.

2. In a machine of the class described, a pair of snapping-rollers having at their lower ends conical points flexibly supported with relation to each other and in horizontal alinement, tapering bodies, and permanent supports for the upper ends of said tapering bodies, said permanent supports being disposed out of horizontal alinement and so spaced that the body of one roller shall partly overlap the body of the other roller.

3. In a machine of the class described, a pair of snapping-rollers having conical points flexibly supported with relation to each other and in horizontal alinement, and permanently-supported upper ends, the upper end of one roller overlapping and in permanent contact with the upper end of the other roller, and a frame adjustably supporting the contacting ends of the rollers.

4. In a machine of the class described, a pair of snapping-rollers having conical points flexibly supported with relation to each other and in horizontal alinement, the upper end of one roller overlapping and in permanent contact with the upper end of the other roller, an adjustable frame having bearings for the contacting and permanently-related upper ends of the roller, and a shield supported by said frame and extending to a line just above the surface of the adjacent roller.

5. In a machine of the class described, a pair of snapping-rollers having conical points in horizontal alinement with each other and spaced apart, and tapering bodies, the one overlapping and terminating in contact with the other, an adjustable frame supporting the contacting ends of the rollers, a shield carried by said frame and resting upon the overlapping roller and means for supporting said frame and for securing it at the desired adjustment.

6. In a machine of the class described, a pair of snapping-rollers having conical points flexibly supported with relation to each other and in horizontal alinement, and tapering bodies, the one overlapping and contacting with the other, in combination with intermeshing spur-wheels mounted upon the engaging upper ends of the rollers, and means for directly driving one of the latter.

7. In a machine of the class described, a pair of snapping-rollers having conical points flexibly supported with relation to each other and in horizontal alinement, and tapering bodies, the one overlapping and in contact with the other, in combination with an endless chain provided with guide-fingers supported adjacent to the overlapping roller-body.

8. In a machine of the class described, a pair of snapping-rollers having conical points spaced apart, in combination with a hinged tray having a triangular portion extending beneath and between the points of said rollers.

9. In a machine of the class described, a pair of snapping-rollers having conical points flexibly supported with relation to each other and in horizontal alinement, and tapering bodies, the one overlapping and terminating in contact with the other, a receiving-chute disposed adjacent to the lower snapping-roller and husking-rollers disposed in pairs to receive the discharge from said chute.

10. In a machine of the class described, a pair of snapping-rollers having conical points spaced apart and tapering bodies, the one overlapping and terminating in contact with the other, a hinged tray disposed beneath and between the front ends of the snapping-rollers and having a slantingly-curved front edge adapted to be engaged by cornstalks entering between the snapping-rollers, a chute disposed to receive the discharge from the snapping-rollers and from the hinged tray, and husking-rollers arranged in pairs to receive the discharge from said chute.

In testimony that I claim the foregoing as my own I have hereto affixed my signature in the presence of two witnesses.

J. FRANKLIN SMITH.

Witnesses:
S. A. LOUGH,
W. BRISTERN.